Jan. 11, 1927.  1,614,274
W. BRIEGEL
COMPRESSOR
Filed March 1, 1926    2 Sheets-Sheet 1

INVENTOR.
William Briegel
BY Frederick W. Barker
ATTORNEY

Jan. 11, 1927.  W. BRIEGEL  1,614,274
COMPRESSOR
Filed March 1, 1926   2 Sheets-Sheet 2
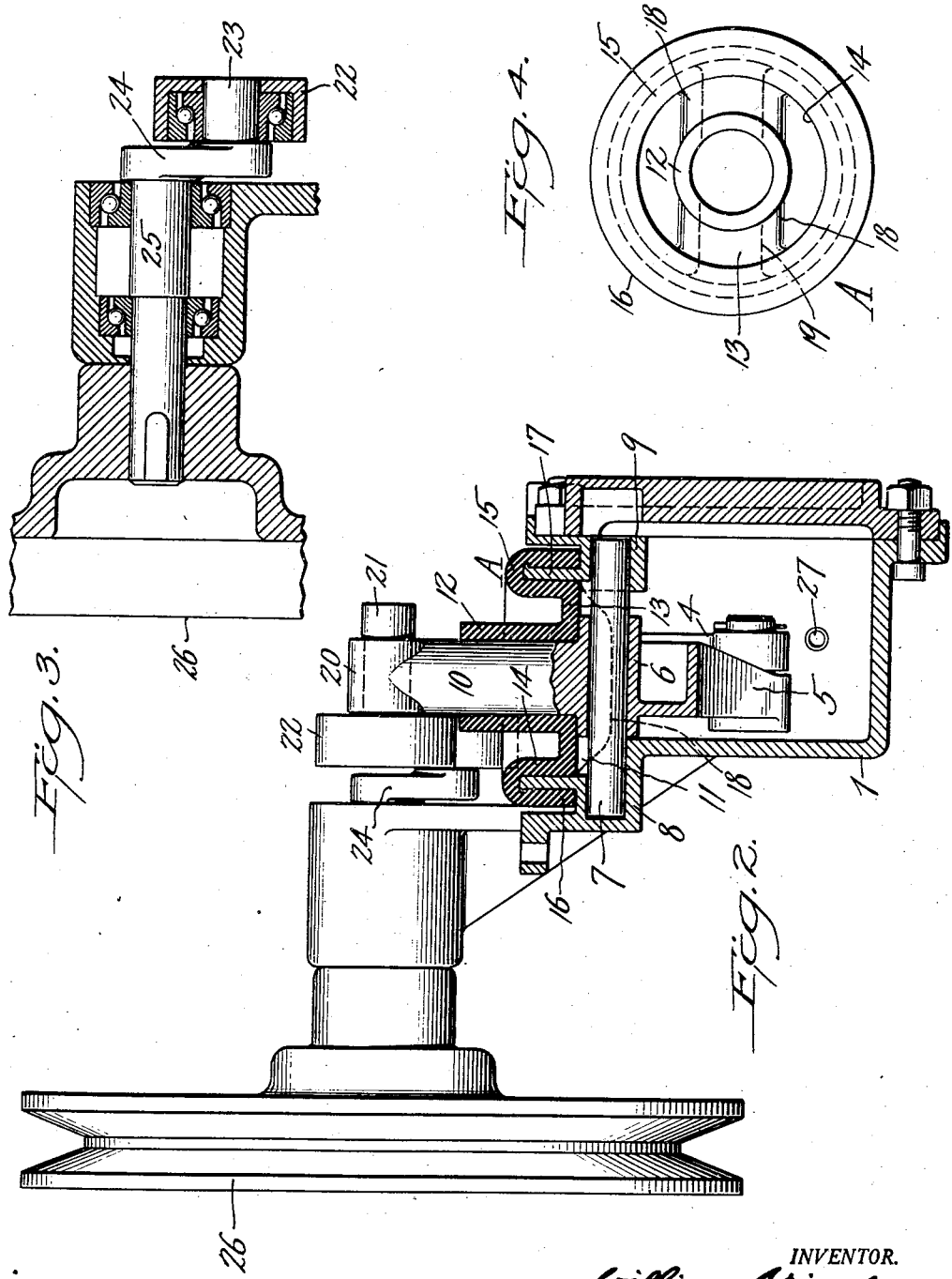
INVENTOR.
William Briegel
BY Frederick W. Barker
ATTORNEY Patented Jan. 11, 1927.                                              1,614,274

UNITED STATES PATENT OFFICE.

WILLIAM BRIEGEL, OF LINDENHURST, NEW YORK, ASSIGNOR, BY MESNE ASSIGN-
MENTS, TO SEAL AND CONTROL CORPORATION, A CORPORATION OF NEW YORK.

COMPRESSOR.

Application filed March 1, 1926. Serial No. 91,453.

This invention relates to compressors and my improvements are directed in particular to devices employed in compressing gaseous fluids wherein the working parts of the compressor are required to be enclosed by a leak-tight casing, with means for preventing the escape of gas past the power communicating member that connects an outside prime mover with the enclosed working parts. Various expedients have been resorted to for packing the bearings of rotating shafts and reciprocating shafts in attempts to prevent the leakage of gaseous fluids such as are employed in refrigerating machines, but so far as I can gather no entirely satisfactory method is in use for reliably confining the refrigerant under the conditions of usage to which these machines are subjected.

Therefore, my present invention, devised to supply the existing need, comprehends the employment of a swaying member as constituting the link between the encased compressor mechanism and the outside driving mechanism, this swaying member being connected to the casing by a flexible diaphragm composed of rubber or other like material, constructed especially to yield under the swaying motion of the power transmitting member and to endure such movement, continued or intermittent, without deterioration, for an extensive period.

Other features and advantages of my invention will hereinafter appear.

In the drawing:—

Fig. 2 is a section on the line 2—2 of Fig. 1.

Fig. 3 is a section on the line 3—3 of Fig. 1, and

Fig. 4 is a plan detail view of the flexible packing device.

Figure 1:
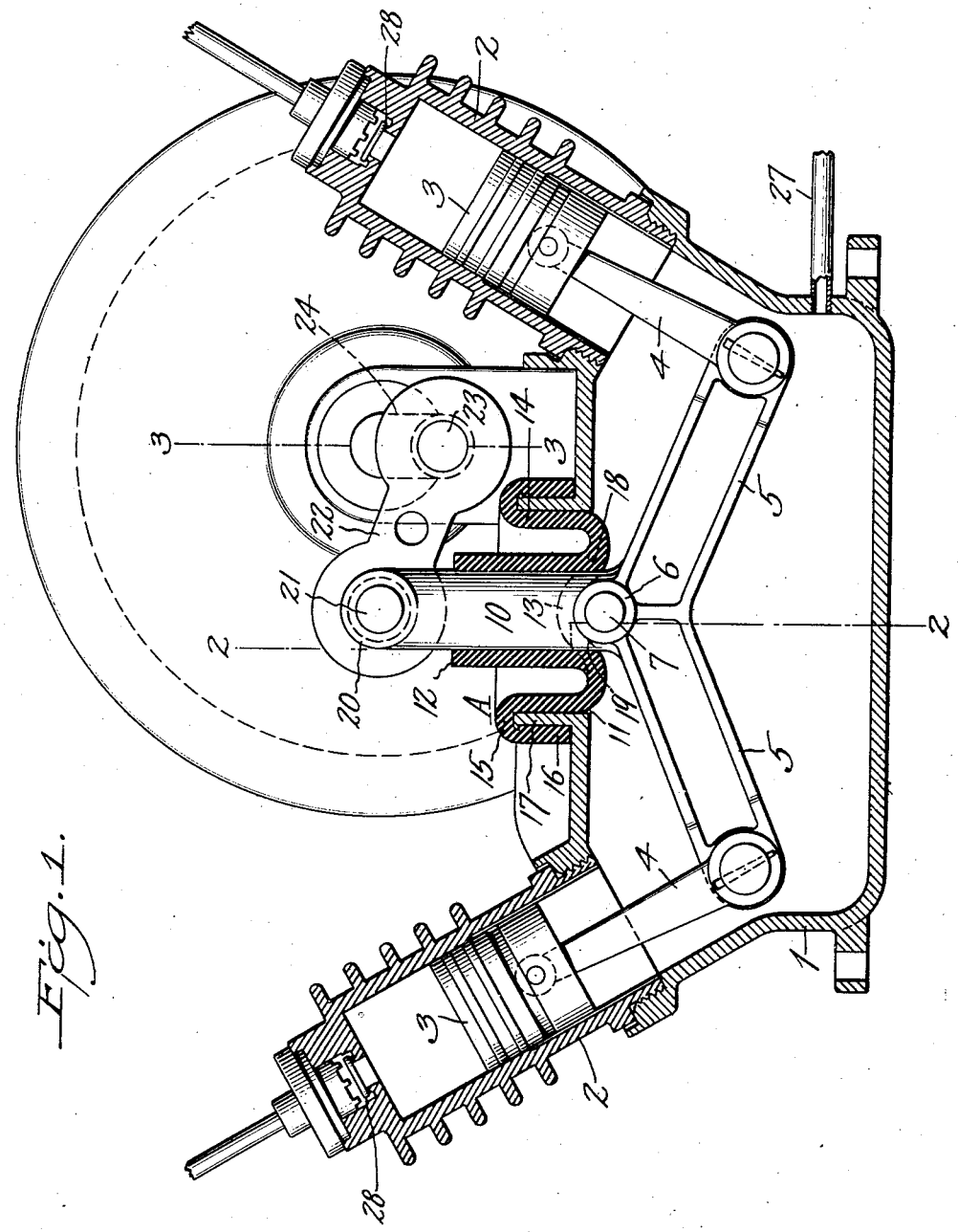
Figure 1 is a side sectional view of a compressor embodying my invention.

In said figures let 1 indicate an enclosed casing, having the cylinders 2, 2, connected therewith at opposite upper ends thereof, and extended divergingly therefrom at opposite angles. The pistons 3—3 of these cylinders connect by rods 4, 4, respectively with the opposite ends of a walking-beam, whose arms 5, 5, are here shown for example as angled to form a wide inverted V. Said walking-beam, at its centre, just above the junction of the arms 5, 5, is provided with a tubular bearing 6, for the reception of a rock-shaft 7, whose projecting ends are respectively journalled in fixed bearings 8, 9, provided in the casing. Extended upwardly from the walking-beam, centrally thereof, is a cylindrical arm 10, forming the connecting link between the driving and driven mechanisms.

An opening 11, formed in the top of casing 1, permits arm 10 to extend through the casing, said opening being of ample area so that arm 10 may have a swaying motion therein about the axis of its shaft 7.

As closure means for the opening 11, I provide a flexible diaphragm composed, for example, of rubber or like material, here indicated by the character A. This diaphragm is circular in form and comprises a gas tight connection between the arm 10 and the top of casing 1. The diaphragm A is especially constructed to enable it to effect the desired gas tight connection and to resist deterioration due to flexing of its material resulting from the swaying action of arm 10, whereby motion is transmitted, through the walking-beam, to the pistons. Thus said diaphragm A has a central tubular portion 12, which tightly fits upon the arm 10; and from the base of said tubular portion the diaphragm has a web 13, that continues into a vertical, concentric fold 14, spaced from portion 12; the fold 14 having an upper outwardly extended web 15, that continues into a depending, concentric fold 16, spaced from the fold 14. The folds 14, 16 are adapted to fit snugly and embracingly in gas tight connection over a concentric wall 17 that extends upwardly from the perimeter of opening 11 in the casing top, thereby completing the enclosing means for the casing 1, to render it gas tight.

Also the diaphragm A has a thickened base portion 18, provided on its under surface with a semi-cylindrical groove 19, to fit, saddle-like, upon the bearing 6. This thickened portion reinforces the diaphragm and permits it to withstand the wear and tear consequent on the rocking motion of arm 10.

Secured to the upper end of arm 10 is a bearing 20, in which is journalled a shaft 21 that projects from one end of a link 22, the other end of said link having journalled therein the crank pin 23 of a crank 24, said crank being carried by the power shaft 25, here shown as driven by a pulley-wheel 26.

Thus the source of energy for the operation of the compressor is here represented by the pulley-wheel 26 and shaft 25.

It will be appreciated from the foregoing description of parts and the showing thereof in the accompanying drawings that the rotation of power shaft 25 is converted by link 22 into a swaying movement of the arm 10 and its connected walking-beam, this movement being transmitted through the arms 5, 5 to the pistons 3, 3 for their reciprocation in the compressor cylinders.

Also it will be appreciated that the gas tight closure of opening 11 by the diaphragm positively prevents the escape of gas from casing 1, whose fluid inlet is shown at 27, the conveyance of fluid from the compressor cylinders being by way of the valves 28 according to usual practice in refrigerating systems.

Now it will be apparent that by reason of the walking-beam action employed by me for the operation of the pistons, the walking-beam having a vertical arm that connects with the crank-actuated link, and the flexible diaphragm being subject to flexure only in the vicinity of the rock-shaft carrying the walking-beam, therefore the extent to which said diaphragm flexes is relatively slight, enabling said diaphragm to endure through a long period of usefulness.

Although I have shown a compressor wherein a pair of cylinders are employed whose pistons are actuated by a walking-beam, obviously the number of cylinders and their pistons may be varied without departing from the spirit of my invention.

Other variations within the spirit and scope of my invention are equally comprehended by the foregoing disclosure.

I claim:

1. A compressor comprising a casing which includes a cylinder, a piston reciprocable in said cylinder, and a connecting rod, said casing provided with an opening, a rock-shaft journalled in said casing, a walking-beam carried by said rock-shaft and engaging said connecting rod, an arm extended from said walking-beam through the opening in the casing, power means to sway said extended arm, thereby operating said rock-shaft and walking-beam, and a flexible diaphragm to cover the casing opening, said diaphragm closely engaging said extended arm and casing to be in gas-tight relation therewith.

2. A compressor comprising a casing which includes a pair of cylinders arranged at opposite angles, pistons respectively reciprocable in said cylinders, and connecting rods, said casing provided with an opening, a rock-shaft journalled in said casing, a walking-beam carried by said rock-shaft and engaging said connecting rods, an arm extended from said walking-beam through the opening in the casing, power means to sway said extended arm, thereby operating said rock-shaft and walking-beam, and a flexible diaphragm to cover the casing opening, said diaphragm closely engaging said extended arm and casing to be in gas-tight relation therewith.

3. The combination with a casing having an opening with an annular flange extended therefrom and a swaying power transmission arm extended through said opening, of a flexible diaphragm to cover said opening, said diaphragm having a central tubular portion embracing said arm and having spaced concentric folds with intervening webs, folds of said diaphragm serving to embracingly engage the aforesaid annular flange.

Executed this 25th day of February, 1926.

WILLIAM BRIEGEL.